US011223220B2

(12) United States Patent
Schartner (10) Patent No.: US 11,223,220 B2
(45) Date of Patent: Jan. 11, 2022

(54) HYBRID WELDING SYSTEMS AND PORTABLE HYBRID WELDING MODULES

(71) Applicant: Illinois Tool Works Inc., Glenview, IL (US)

(72) Inventor: Quinn William Schartner, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 746 days.

(21) Appl. No.: 15/338,831

(22) Filed: Oct. 31, 2016

(65) Prior Publication Data

US 2018/0123370 A1  May 3, 2018

(51) Int. Cl.
*H02J 7/00* (2006.01)
*B23K 9/10* (2006.01)
*B23K 9/16* (2006.01)
*G05F 5/00* (2006.01)

(52) U.S. Cl.
CPC .......... *H02J 7/0068* (2013.01); *B23K 9/1006* (2013.01); *B23K 9/1043* (2013.01); *B23K 9/1062* (2013.01); *B23K 9/16* (2013.01); *G05F 5/00* (2013.01)

(58) Field of Classification Search
CPC ... H02J 7/0068; B23K 9/1006; B23K 9/1043; B23K 9/1062; B23K 9/16; G05F 5/00
See application file for complete search history.

(56) References Cited

U.S. PATENT DOCUMENTS

| | | |
|---|---|---|
| 6,225,596 B1 | 5/2001 | Chandler et al. |
| 6,777,649 B2 | 8/2004 | Reynolds et al. |
| 6,818,860 B1 | 11/2004 | Stava et al. |
| 6,982,398 B2 | 1/2006 | Albrecht |
| 7,119,450 B2 | 10/2006 | Albrecht |
| 7,183,517 B2 | 2/2007 | Albrecht et al. |
| 7,202,636 B2 | 4/2007 | Reynolds et al. |
| 7,446,503 B2 | 11/2008 | Stanzel et al. |
| D611,074 S | 3/2010 | Bashore et al. |

(Continued)

FOREIGN PATENT DOCUMENTS

CN        106059346        10/2016

OTHER PUBLICATIONS

Int'l Search Report and Written Opinion for PCT/US201/058961 dated Apr. 5, 2018 (14 pgs.).

*Primary Examiner* — Christopher S Kim
(74) *Attorney, Agent, or Firm* — McAndrews, Held & Malloy, Ltd.

(57) ABSTRACT

Hybrid welding systems and portable hybrid welding modules are disclosed. An example portable welding power supply includes an output converter circuit to convert direct current (DC) power to welding power, the DC power comprising at least one of DC input power or converted battery power. The portable welding power supply also includes a battery and a bidirectional DC-DC converter circuit configured to receive the DC input power and coupled to the battery. The portable welding power supply also includes a control circuit configured to control the output converter to output the welding power, control the bidirectional DC-DC converter circuit to convert the DC input power to charge the battery, and control the bidirectional DC-DC converter circuit to convert power from the battery to provide the battery power to the output converter.

21 Claims, 7 Drawing Sheets

(56) References Cited

U.S. PATENT DOCUMENTS

| | | |
|---|---|---|
| 7,750,600 B2 | 7/2010 | Stanzel et al. |
| 7,777,447 B2 | 8/2010 | Vogel |
| 7,795,840 B2 | 9/2010 | Vogel et al. |
| 7,838,797 B2 | 11/2010 | Albrecht |
| 7,868,588 B2 | 1/2011 | Altekruse et al. |
| 8,080,761 B2 | 12/2011 | Matthews et al. |
| 8,405,001 B2 | 3/2013 | Albrecht |
| 8,415,588 B2 | 4/2013 | Albrecht |
| 8,476,555 B2 | 7/2013 | Diedrick et al. |
| 8,507,830 B2 | 8/2013 | Albrecht |
| 8,558,139 B2 | 10/2013 | Albrecht |
| 8,569,652 B2 | 10/2013 | Albrecht et al. |
| 8,640,799 B2 | 2/2014 | Beeson |
| 8,735,775 B2 | 5/2014 | Kaufman |
| 8,759,714 B2 | 6/2014 | Fosbinder |
| 8,791,388 B2 | 7/2014 | Albrecht |
| 8,803,032 B2 | 8/2014 | Matthews et al. |
| 8,841,583 B2 | 9/2014 | Albrecht |
| 8,884,189 B2 | 11/2014 | Borchert et al. |
| 8,969,762 B2 | 3/2015 | Beeson et al. |
| 9,254,534 B2 | 2/2016 | Magerl et al. |
| 9,278,403 B2 | 3/2016 | Albrecht |
| 9,302,339 B2 | 4/2016 | Burkhart et al. |
| 9,333,583 B2 | 5/2016 | Beeson |
| 10,166,624 B2 | 1/2019 | Furman |
| 2007/0181547 A1 | 8/2007 | Vogel et al. |
| 2007/0187376 A1 | 8/2007 | Albrecht et al. |
| 2007/0215585 A1 | 9/2007 | O'Connor |
| 2008/0314885 A1 | 12/2008 | Hutchison |
| 2009/0057285 A1 | 3/2009 | Bashore |
| 2010/0097031 A1 | 4/2010 | King |
| 2011/0114608 A1 | 5/2011 | Albrecht |
| 2012/0006792 A1 | 1/2012 | Rozmarynowski et al. |
| 2012/0175356 A1 | 7/2012 | Magerl et al. |
| 2012/0241430 A1 | 9/2012 | Luck et al. |
| 2013/0169050 A1* | 7/2013 | Tseng .................. H04L 12/10 307/65 |
| 2014/0001167 A1 | 1/2014 | Bunker |
| 2014/0054276 A1 | 2/2014 | Albrecht et al. |
| 2014/0131329 A1 | 5/2014 | Meckler |
| 2014/0263238 A1 | 9/2014 | Ulrich et al. |
| 2014/0263245 A1 | 9/2014 | Ulrich et al. |
| 2014/0299589 A1 | 10/2014 | Fosbinder |
| 2015/0069975 A1 | 3/2015 | Farah et al. |
| 2015/0072182 A1 | 3/2015 | Maglietta et al. |
| 2015/0083701 A1 | 3/2015 | Burkhart et al. |
| 2015/0183043 A1 | 7/2015 | Starzengruber et al. |
| 2015/0249349 A1 | 9/2015 | Binder et al. |
| 2015/0314387 A1 | 11/2015 | Starzengruber et al. |

* cited by examiner

HYBRID WELDING SYSTEMS AND PORTABLE HYBRID WELDING MODULES

BACKGROUND

The invention relates generally to welding systems, and more particularly to hybrid welding modules.

Conventional welding power supplies are limited to their rated output. In some cases, battery-assisted systems have been used to increase the capacity of welding power supplies. However, conventional battery assisted systems are either integrated with the welding power supply or require the welding power supply to be reconfigured between charging the battery and welding.

SUMMARY

Hybrid welding systems and portable hybrid welding modules are disclosed, substantially as illustrated by and described in connection with at least one of the figures, as set forth more completely in the claims.

DETAILED DESCRIPTION

Disclosed example portable hybrid welding modules include or connect to an energy storage device, which can be charged and/or discharged to provide welding-type power. Disclosed portable hybrid welding modules connect to a charging module to obtain power for welding and/or for charging the energy storage device. The portable welding power module may be used with the charging module and without the charging module, depending on the requirements of the weld to be performed. Disclosed examples include a bidirectional DC-DC converter to convert power from the charging module to charge the energy storage device and/or to convert power from the energy storage device to supplement the power from the charging module.

Disclosed examples separate the charging module, which can be heavy and/or difficult to carry to a remote welding location, from the portable hybrid welding module, which may be lighter and easier to carry to the remote welding location. Thus, a welding operator can charge the energy storage device by connecting the charging module to the portable hybrid welding module, and subsequently disconnect the portable hybrid welding module from the charging module to reduce the equipment to be carried to the remote welding site while still enabling the weld to be performed at the remote welding site.

Disclosed portable hybrid welding modules also enable a reduction in the output capacity of the charging module relative to the power used for welding. For example, if the charging module is capable of outputting 1500 Watts of power, the weld operator may use the charging module in combination with the portable hybrid welding module and an energy storage device to increase the output power capacity to more than 1500 Watts.

Disclosed example portable welding power supplies include an output converter circuit, a battery, a bidirectional DC-DC converter circuit, and a control circuit. The output converter circuit converts direct current (DC) power to welding power. The DC power is at least one of DC input power or converted battery power. The bidirectional DC-DC converter circuit receives the DC input power and coupled to the battery. The a control circuit controls the output converter to output the welding power, controls the bidirectional DC-DC converter circuit to convert the DC input power to charge the battery, and controls the bidirectional DC-DC converter circuit to convert power from the battery to provide the converted battery power to the output converter.

In some examples, the battery is removable from the portable welding power supply. In some examples, the control circuit detects whether the battery is a recognized battery unit and, when the control circuit detects that the battery is the recognized battery unit: controls the bidirectional DC-DC converter circuit to charge the battery based on one or more predetermined characteristics of the recognized battery unit, and controls the bidirectional DC-DC converter circuit to control the power from the battery based on the one or more predetermined characteristics of the recognized battery unit. Some such examples further include a display device, and the control circuit, in response to detecting that the battery is not the recognized battery unit: enables welding without use of the battery; disables the bidirectional DC-DC converter circuit; and displays a notification via the display device. In some examples, when the control circuit detects that the battery is the recognized battery unit, the control circuit controls the output converter to limit the welding power based on the one or more predetermined characteristics of the recognized battery unit.

In some example portable welding power supplies, the control circuit is configured to determine whether a charging device is connected to the portable welding power supply based on at least one of detecting the DC input power, detecting a connection with the charging device via a communications terminal, or detecting an analog or digital signal. In some such examples, the control circuit controls output power from in the charging device.

In some examples, the control circuit is configured to monitor at least one of an output current and an output voltage from the output converter, an input current to a charging device, or a regulated DC input voltage of the DC input power. The control circuit determines whether a threshold output of the charging device has been exceeded based on the at least one of the output current and the output voltage from the output converter, the input current to the charging device, or the regulated DC input voltage. The control circuit controls the bidirectional DC-DC converter circuit to provide the converted battery power to the output converter when the threshold output of the charging device has been exceeded. In some such examples, the portable welding power supply further includes a user interface device, and the control circuit indicates a mode of operation via the user interface device. The mode of operation includes at least one of a battery charging mode, an external power welding mode in which the DC input power is provided to the output converter for welding while the bidirectional DC-DC converter circuit does not provide the converted battery power, a battery welding mode in which the bidirectional DC-DC converter circuit provides the converted battery power to the output converter for welding while the DC input power is not available, or a hybrid welding boost mode in which the DC input power is provided to the output converter and the bidirectional DC-DC converter circuit provides the converted battery power to the output converter for welding.

In some examples, the control circuit determines whether the threshold output of the charging device has been exceeded by comparing the output current and the output voltage to a voltage-amperage curve associated with the charging device. In some examples, the control circuit controls the bidirectional DC-DC converter circuit to provide the converted battery power to the output converter by controlling the bidirectional DC-DC converter circuit to output a converted voltage less than the threshold output voltage of the charging device.

In some examples, the control circuit determines whether a threshold output of a charging device has been exceeded and, when the threshold output has been exceeded, enables the bidirectional DC-DC converter circuit to provide the converted battery power to the output converter.

In some examples, at least one of the DC input power or the converted battery power are regulated power. In some examples, at least one of the DC input power or the converted battery power are unregulated power. In some examples, the control circuit is configured to detect a state-of-charge of the battery, control the bidirectional DC-DC converter circuit to charge the battery based on the state-of-charge of the battery, and control the bidirectional DC-DC converter circuit to output the power from the battery based on the state-of-charge of the battery. In some such examples, the control circuit controls the output converter to limit the welding power based on the state-of-charge of the battery.

Some disclosed example portable welding power supplies further comprising include a user interface device. The control circuit measures a charge state of the battery and/or receives the charge state from a recognized battery, and indicates the charge state via the user interface device.

Disclosed example hybrid power welding systems include a primary power adapter and a portable welding power supply. The primary power adapter converts primary power to DC input power. The portable welding power supply includes an output converter circuit, a battery, a bidirectional DC-DC converter circuit, and a control circuit. The output converter circuit converts DC power to welding power, where the DC power includes the DC input power and/or converted battery power. The bidirectional DC-DC converter circuit receives the DC input power and is coupled to the battery. During a battery charging mode, the control circuit controls the bidirectional DC-DC converter circuit to convert the DC input power to charge the battery. During an external input welding mode, the control circuit controls the output converter to convert the DC input power to the welding power and to output the welding power. During a hybrid welding boost mode, the control circuit controls the bidirectional DC-DC converter circuit to convert power from the battery to provide the converted battery power to the output converter, and controls the output converter to convert the converted battery power and the DC input power to the welding power to increase the welding power to be greater than the DC input power. During a hybrid welding-charging mode, the control circuit controls the bidirectional DC-DC converter circuit to buck a first portion of the DC input power to charge the battery and controls the output converter to convert a second portion of the DC input power to the welding power and to output the welding power.

In some examples, the battery is removable from the portable welding power supply. Some example hybrid power welding systems further include a user interface device, and the control circuit selects between the external input welding mode and the hybrid welding boost mode based on receiving an input via the user interface device. In some examples, the primary power adapter includes a power factor correction circuit to correct a power factor of the primary power and to rectify the primary power and a DC-DC converter circuit coupled to an output of the power factor correction circuit to generate the DC input power.

In some example hybrid power welding systems, the primary power adapter is detachable from the portable welding power supply. In some examples, the control circuit communicates with the primary power adapter to control the DC input power provided by the primary power adapter. In some examples, the control circuit uses the battery welding mode to provide weld start power when the primary power adapter is powered down or in an idle state and not capable of providing at least threshold weld start power, and controls the primary power adapter to enter an active mode to provide the DC input power.

In some examples, the control circuit automatically switches between two or more of the battery charging mode, the external input welding mode, the hybrid welding boost mode, and the hybrid welding-charging mode.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "bidirectional DC-DC converter" refers to any bidirectional circuit topology that converts voltage down (e.g., bucks) in a first direction and converts voltage up (e.g., boosts) in a second direction. Example bidirectional DC-DC converters include buck-boost and/or boost-buck topologies, a SEPIC converter, a auk converter, or the like.

As used herein, the term "recognized battery unit" refers to a battery unit that is approved, authorized, and/or otherwise has identifiable minimum characteristics, such as charge state, nominal voltage, minimum voltage, maximum voltage, and/or charge capacity. Recognition can occur through signaling, measurement, and/or any other mechanism.

As used herein, a "circuit" includes any analog and/or digital components, power and/or control elements, such as a microprocessor, digital signal processor (DSP), software, and the like, discrete and/or integrated components, or portions and/or combinations thereof.

Figure 1:
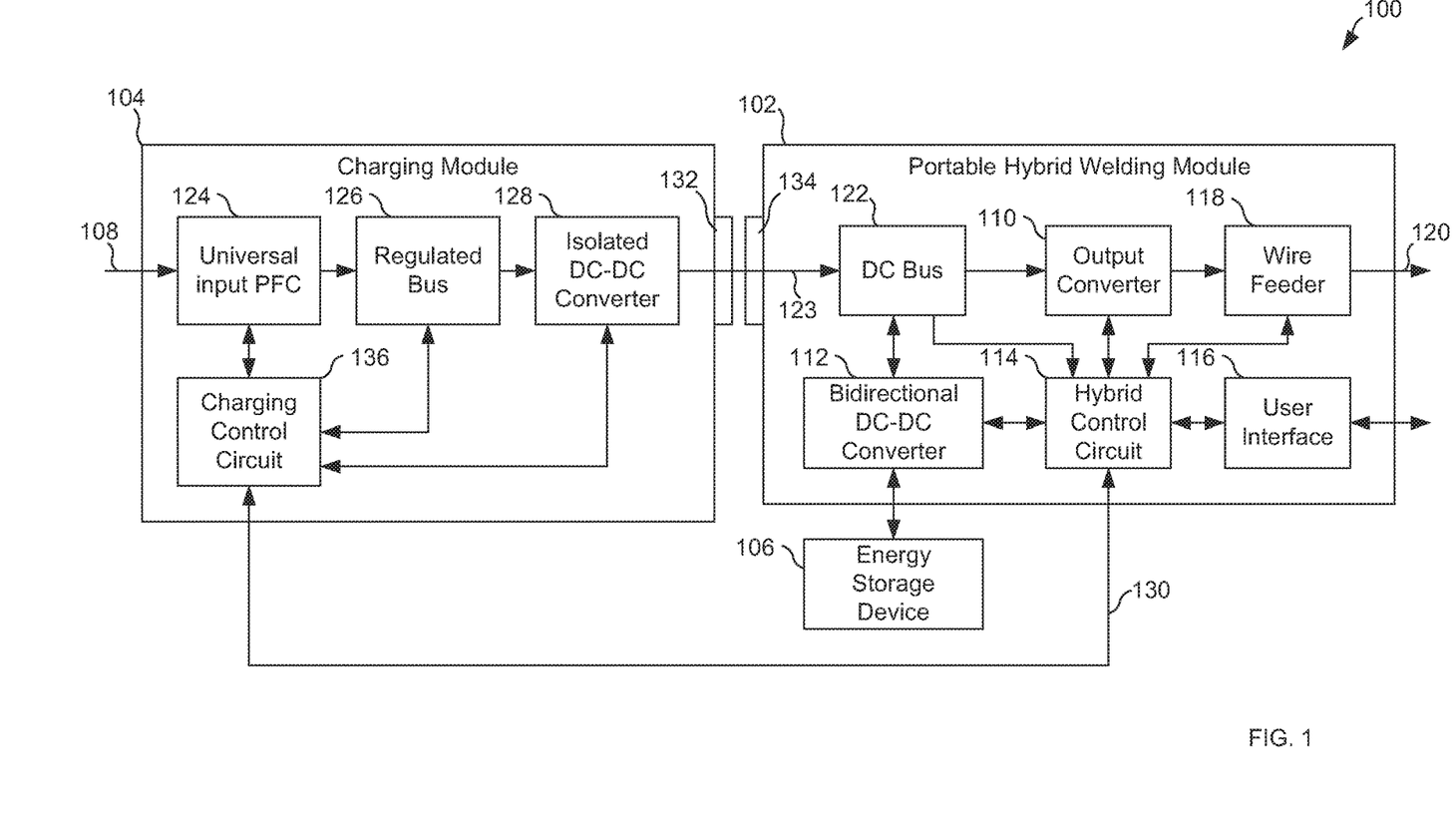
FIG. 1 is a block diagram of an example hybrid welding system in accordance with aspects of this disclosure.

FIG. 1 is a block diagram of an example hybrid welding system 100. The example hybrid welding system 100 of FIG. 1 includes a portable hybrid welding module 102 and a charging module 104. The portable hybrid welding module 102 and a charging module 104 may be connected and disconnected as desired to enable the portable hybrid welding module 102 to reduce the weight of the system 100 for welding operations.

The portable hybrid welding module 102 is connected to an energy storage device 106. The charging module 104 receives and converts AC input power 108 from a power source such as a generator, a mains power supply, and/or any other power source. When the charging module 104 is connected to the AC input power 108 and to the portable hybrid welding module 102, the portable hybrid welding module 102 may charge the energy storage device 106. Conversely, when energy is required that is not available from the charging module 104, the energy storage device 106 may provide power to the portable hybrid welding module 102.

The portable hybrid welding module 102 includes an output converter 110, a bidirectional DC-DC converter 112, a hybrid control circuit 114, a user interface 116, and a wire feeder 118.

The output converter 110 is a circuit that converts direct current (DC) power to welding power 120. The DC power used by the output converter 110 is received from a DC bus 122. The DC bus 122 is coupled to an output of the charging module 104 and the bidirectional DC-DC converter 112. The DC bus 122 may receive DC input power 123 from the charging module 104 and/or from battery power converted by the bidirectional DC-DC converter 112, and/or a combination of the DC input power 123 and the converted battery power. The DC input bus 122 may be a regulated DC bus or an unregulated DC bus. The output converter 110 receives power from the DC bus 122.

The bidirectional DC-DC converter 112 is a circuit that converts the DC input power from the charging module 104 to charge the energy storage device 106 and converts the battery power stored in the energy storage device 106 to converted battery power to output to the DC bus 122 for output to the output converter 110.

The hybrid control circuit 114 controls the output converter 110 to output the welding power 120. The hybrid control circuit 114 controls the bidirectional DC-DC converter 112 to convert power from the DC bus 122 to charge the energy storage device 106 and/or controls the bidirectional DC-DC converter 112 to convert power from the energy storage device 106 to provide the converted battery power to the DC bus 122. The hybrid control circuit 114 controls the bidirectional DC-DC converter 112 to charge the energy storage device 106 when the DC input power 123 is available (e.g., when the charging module 104 is connected to the portable hybrid welding module 102 and is converting the AC input power 108) and at least a portion of the DC input power 123 is available for charging the energy storage device 106 (e.g., the DC input power 123 is not completely consumed by the output converter 110 and/or the wire feeder 118). Conversely, the hybrid control circuit 114 controls the bidirectional DC-DC converter 112 to convert power from the energy storage device 106 to provide the converted battery power to the DC bus 122.

The example charging module 104 receives the AC input power 108 and converts the AC input power 108 to output the DC input power 123 to the portable hybrid welding module 102. The charging module 104 includes an input power factor correction (PFC) circuit 124, a regulated bus 126, and an isolated DC-DC converter 128. The charging module 104 is capable of providing welding power to the portable hybrid welding module 102.

The hybrid control circuit 114 determines whether the charging module 104 is connected to the portable hybrid welding module 102 based on detecting the DC input power 123, detecting a connection 130 with the charging module 104 via a communications terminal, or detecting an analog or digital signal.

The power factor correction circuit 124 performs power factor correction on the AC input power 108. The charging control circuit 136 controls the power factor correction circuit 124, the regulated bus 126, and/or the isolated DC-DC converter 128 in the charging module 104. The charging circuit 136 may receive and/or transmit feedback and/or commands from the hybrid control circuit 114 for controlling the portable hybrid welding module 102 and/or the charging module 104. The power factor correction circuit 124 outputs power factor corrected and regulated power to the regulated bus 126, which is input to the isolated DC-DC converter 128. When the charging module 104 is connected to the portable hybrid welding module 102, the isolated DC-DC converter 128 outputs the DC input power 123 to the portable hybrid welding module 102 via connectors 132, 134. The connectors 132, 134 may be a plug, a jack, and/or any other type of electrical connector and/or conductor(s) suitable for conducting welding-type levels of current. The connector 132 may also provide the connection 130 between the hybrid control circuit 114 and the charging control circuit 136.

The hybrid control circuit 114 monitors an output current and an output voltage from the output converter 110, a current of the DC input power 123, and/or the voltage of the DC bus 122. The hybrid control circuit 114 determines whether a threshold output of the charging module 104 has been exceeded based on the output current and/or an output voltage from the output converter 110, a current of the DC input power 123, or the voltage of the DC bus 122. The hybrid control circuit 114 controls the bidirectional DC-DC converter 112 to provide the power from the DC bus 122 to the output converter 110 when the threshold output of the charging module 104 has been exceeded. Alternatively, the hybrid control circuit 114 communicates with the charging control circuit 136 and determines whether a threshold output of the charging module 104 has been exceeded.

The user interface 116 enables input to the portable hybrid welding module 102 and/or output from the portable hybrid welding module 102 to a user. The hybrid control circuit 114 may indicate the state of charge of the energy storage device 106 and/or a mode of operation, such as a battery charging mode, an external power welding mode (e.g., welding mode), a combination welding-charging mode, a battery powered welding mode (e.g., discharge mode), or a hybrid welding mode (e.g., welding boost mode), of the portable hybrid welding module 102 via the user interface 116. The battery charging mode, the external power welding mode, the battery powered welding mode, the combination welding-charging mode, and the hybrid welding mode are described in more detail below.

In the example of FIG. 1, the hybrid control circuit 114 controls the bidirectional DC-DC converter 112 to provide converted stored power from the energy storage device 106 to the DC bus 122 to supplement the DC input power 123. For example, the hybrid control circuit 114 may control the bidirectional DC-DC converter 112 to output a converted voltage that is less than a threshold output voltage of the charging module 104. The threshold output voltage may correspond to a nominal voltage of the DC bus 122, less a threshold voltage droop. When the output capacity of the charging module 104 is exceeded, the voltage droop on the DC bus 122 causes the DC bus 122 to decrease below the output voltage (e.g., boosted voltage) of the bidirectional DC-DC converter 112 converting the stored power from the energy storage device 106.

In some other examples, the hybrid control circuit 114 may determine whether a threshold output of the charging module 104 has been exceeded and, when the threshold output has been exceeded, enable the bidirectional DC-DC converter 112 to provide converted stored power to the DC bus 122 (to be provided to the output converter 110). For example, the hybrid control circuit 114 may determine whether a threshold output of the charging module 104 has been exceeded by comparing the output current and/or the output voltage to a voltage-amperage curve of the charging module 104. When the threshold output of the charging module 104 is exceeded, the hybrid control circuit 114 enables the bidirectional DC-DC converter 112 to convert the stored energy from the energy storage device 106 to the output converter 110 in combination with the DC input power 123 on the DC bus 122.

The hybrid control circuit 114 may also communication via the connection 130 to the charging control circuit 136 to coordinate the power balance from the charging module 102 and the energy storage device 106 to the DC bus 122.

The example wire feeder 118 includes a wire feed motor to provide electrode wire to the welding operation (e.g., when the welding operation involves a wire feeder, such as when gas metal arc welding, flux cored arc welding, etc.). When the welding operation involves a wire feeder, the hybrid control circuit 114 controls powers the wire feeder 118.

Figure 2:
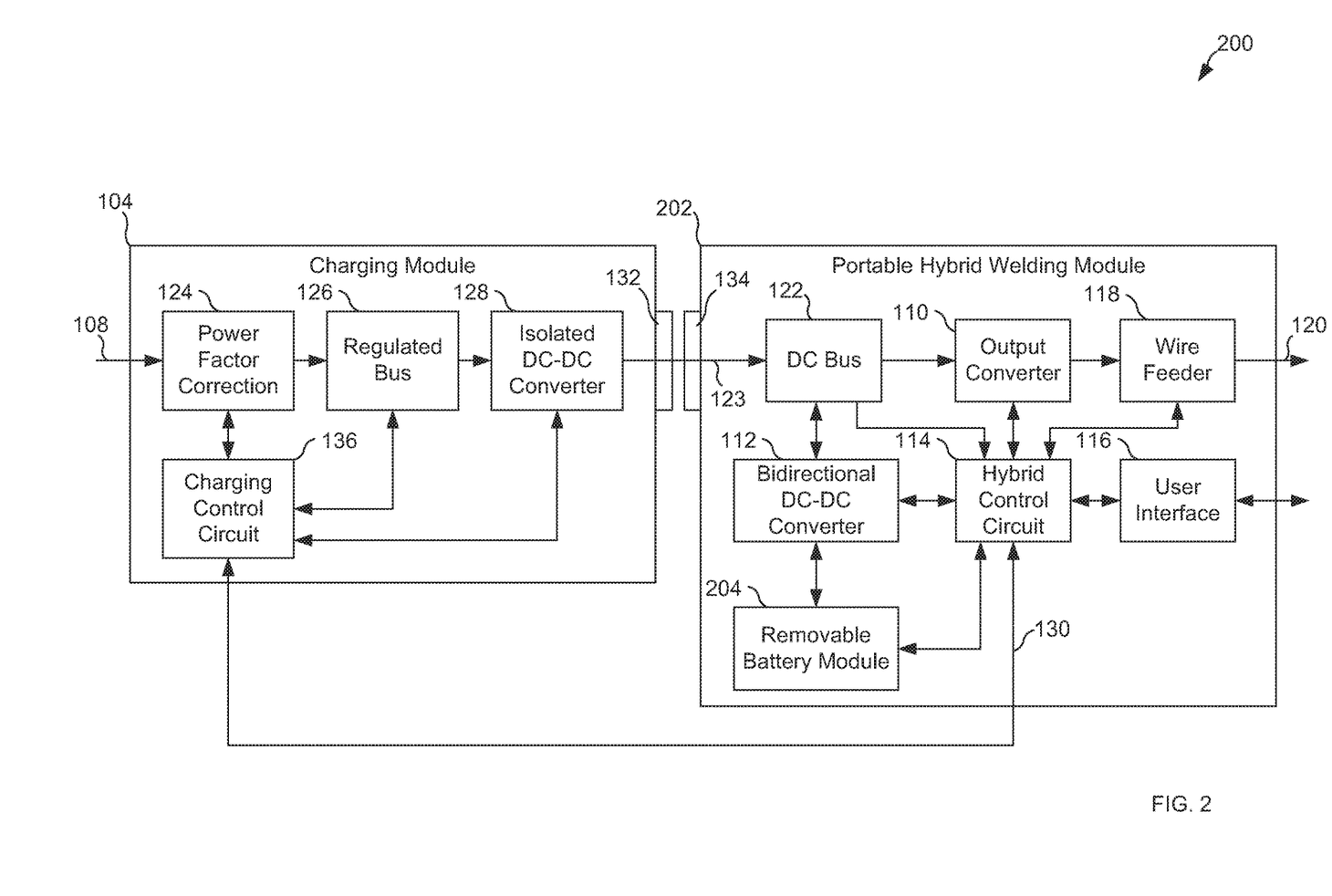
FIG. 2 is a block diagram of another example hybrid welding system in accordance with aspects of this disclosure.

FIG. 2 is a block diagram of another example hybrid welding system 200. The example hybrid welding system 200 is similar to the hybrid welding system 100 of FIG. 1. The hybrid welding system 200 includes a portable hybrid welding module 202 and the charging module 104 of FIG. 1. The portable hybrid welding module 202 is similar to the portable hybrid welding module 102 of FIG. 1, with the exception that instead of being connected to an external energy storage device, the portable hybrid welding module 202 includes a removable battery module 204. The portable hybrid welding module 202 similarly includes the output converter 110, bidirectional DC-DC converter 112, the hybrid control circuit 114, the user interface 116, the wire feeder 118, and the DC bus 122.

The removable battery module 204 may be a simple battery or may include one or more battery control circuits to manage the charge state, charging, and/or discharging of the removable battery module 204. In some examples, the hybrid control circuit 114 communicates with the removable battery module 204 to determine whether the removable battery module 204 is a recognized battery unit. For example, the portable hybrid welding module 202 may be configured to operate with certain types of battery packs having specific characteristics. The hybrid control circuit 114 may communicate with a circuit in the removable battery module 204 to identify the type of battery pack and, if a type of battery pack is identified, determine whether the identified type is recognized. A removable battery module 204 may be recognized by being authorized, approved, included in a list of battery packs accessible by the hybrid control circuit 114, and/or through any other method of recognition or identification of the removable battery module 204 as suitable.

When the hybrid control circuit 114 detects that the removable battery module 204 is recognized, the hybrid control circuit 114 may control the bidirectional DC-DC converter 112 to charge the removable battery module 204 based on one or more predetermined characteristics of the removable battery module 204 (e.g., charge state, energy storage capacity, etc.). The hybrid control circuit 114 may also control the bidirectional DC-DC converter 112 to convert power from the removable battery module 204 based on the one or more characteristics of the authorized battery unit to provide the converted power to the DC bus 122. The hybrid control circuit 114 may, in some examples, control the output converter 110 to limit the welding power based on the one or more characteristics of the removable battery module 204.

Conversely, if the hybrid control circuit 114 does not identify the removable battery module 204 as a recognized battery, the hybrid control circuit 114 may enable welding without use of the removable battery module 204, (e.g., control the bidirectional DC-DC converter 112 so as to disable converting power from the removable battery module 204), disable the bidirectional DC-DC converter 112 (e.g., prevent the bidirectional DC-DC converter 112 from charging or discharging the removable battery module 204), and/or display a notification via the user interface 116. The notification may be a simple LED, a text-based message, an image displayed via the display device, an audible alert, an and/or any other type of notification.

FIGS. 3-7 below illustrate current flow during different modes of operation of the hybrid welding system 100 of FIG. 1. While FIGS. 3-7 are described below with reference to the hybrid welding system 100, the current flow illustrated in FIGS. 3, 4, 5, 6, and/or 7 may additionally or alternatively occur during the same or similar welding modes for the hybrid welding system 200 of FIG. 2.

Figure 3:
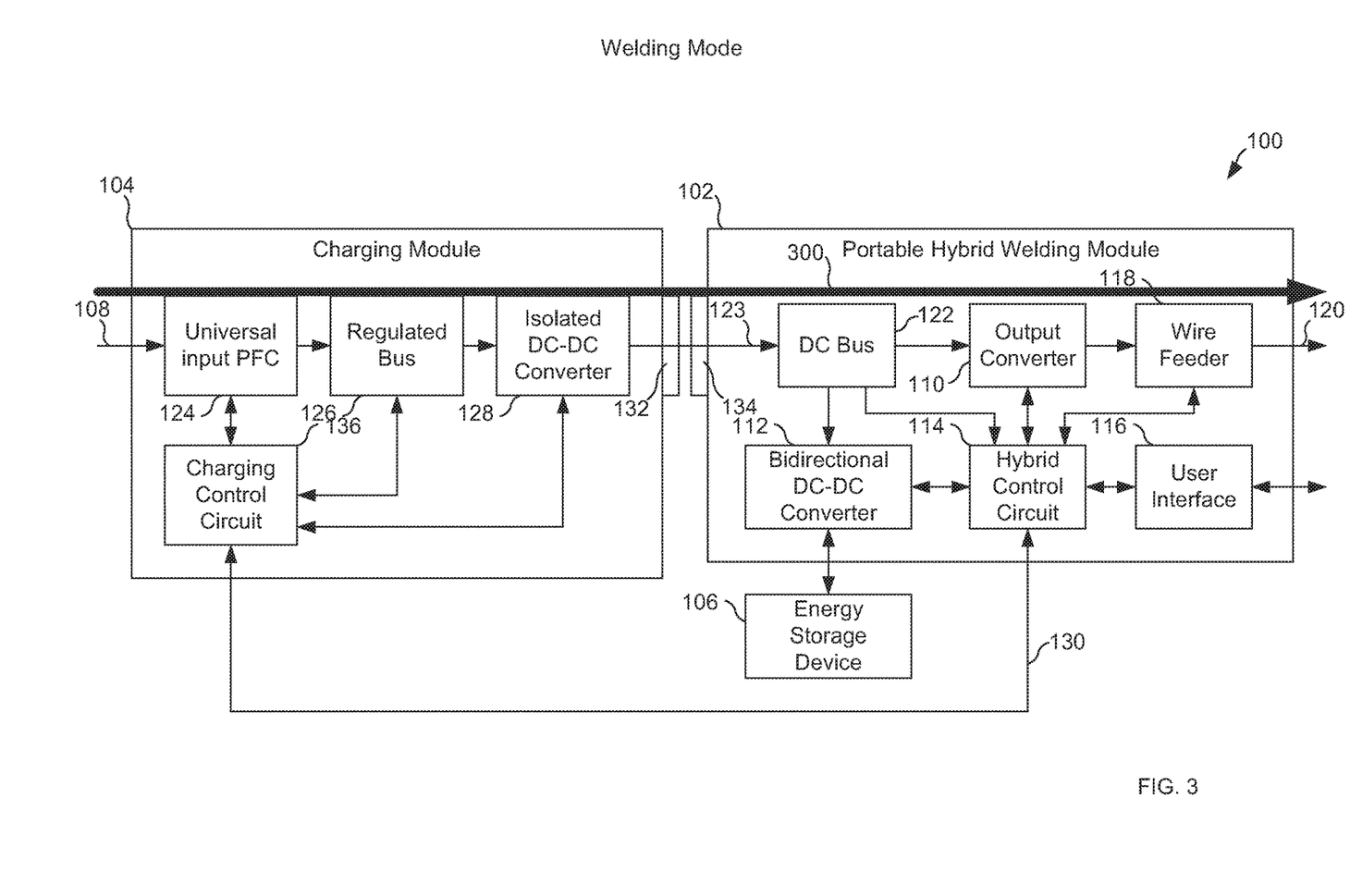
FIG. 3 illustrates current flow in the example hybrid welding system of FIG. 1 during a welding mode.

FIG. 3 illustrates current flow 300 in the example hybrid welding system 100 of FIG. 1 during a welding mode (also referred to herein as an external power welding mode). In the welding mode, the charging module 104 converts the AC input power 108 to the DC input power 123. The portable hybrid welding module 102 receives the DC input power 123 from the charging module 104 via the connectors 132, 134, to the DC bus 122, and the output converter 110 converts the power received from the DC bus 122 to the welding power 120. Thus, during the welding mode, to provide the current flow 300 the DC input power 123 is provided to the DC bus 122 for welding while the bidirectional DC-DC converter 112 does not output power from the DC bus 122 (e.g., from the energy storage device 106).

Figure 4:
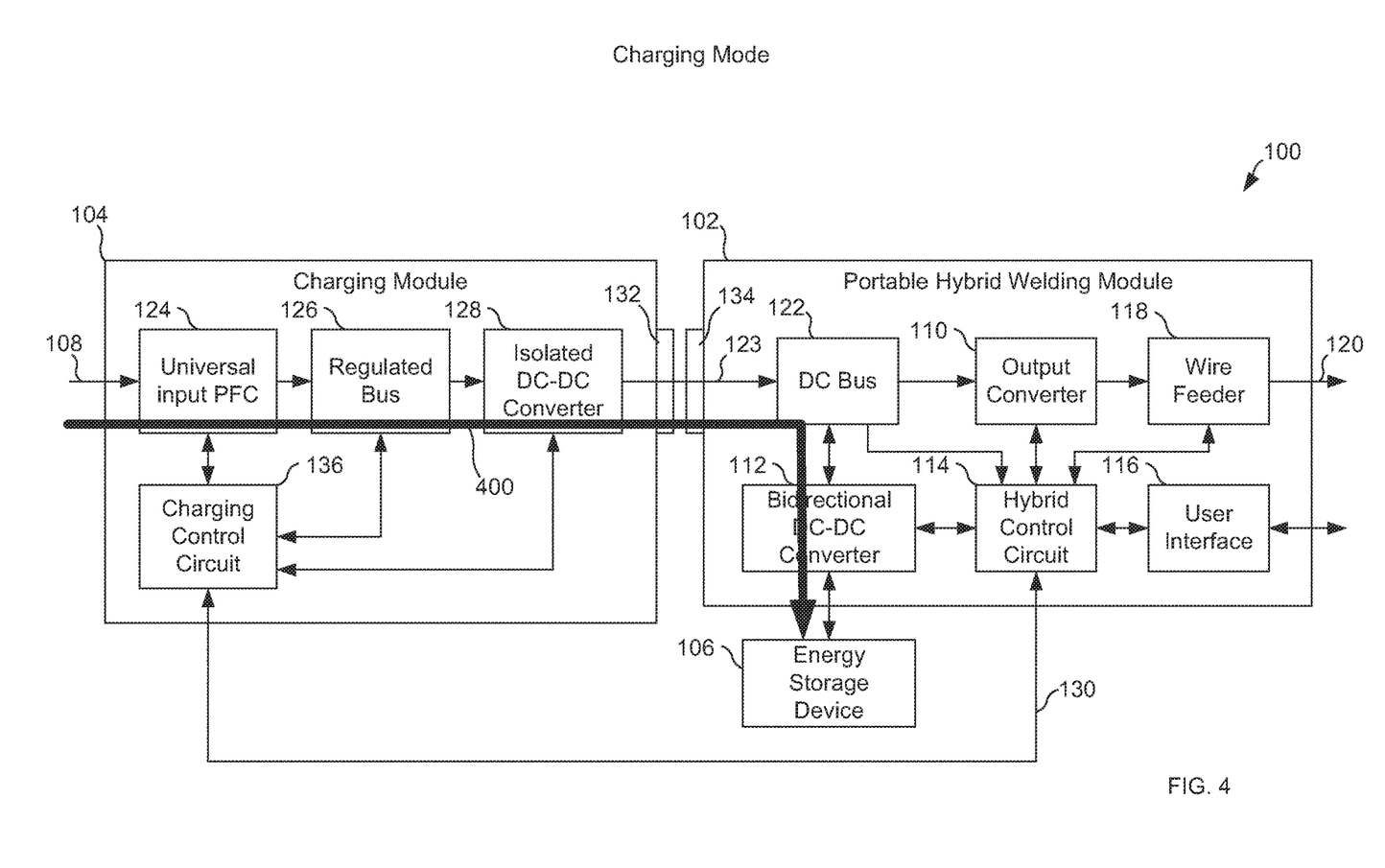
FIG. 4 illustrates current flow in the example hybrid welding system of FIG. 1 during a charging mode.

FIG. 4 illustrates current flow 400 in the example hybrid welding system 100 of FIG. 1 during a charging mode. During the charging mode, the portable hybrid welding module 102 does not output the welding power 120 (e.g., no welding operation is occurring). As such, the DC input power 123 from the charging module 104 may be directed to the DC bus 122 to charge the energy storage device 106. During the charging mode, the hybrid control circuit 114 controls the bidirectional DC-DC converter 112 to convert power from the DC bus 122 to charge the energy storage device 106, creating the current flow 400 from the AC input power 108 to the DC input power 123 and to the energy storage device 106 via the DC bus 122 and the bidirectional DC-DC converter 112.

Figure 5:
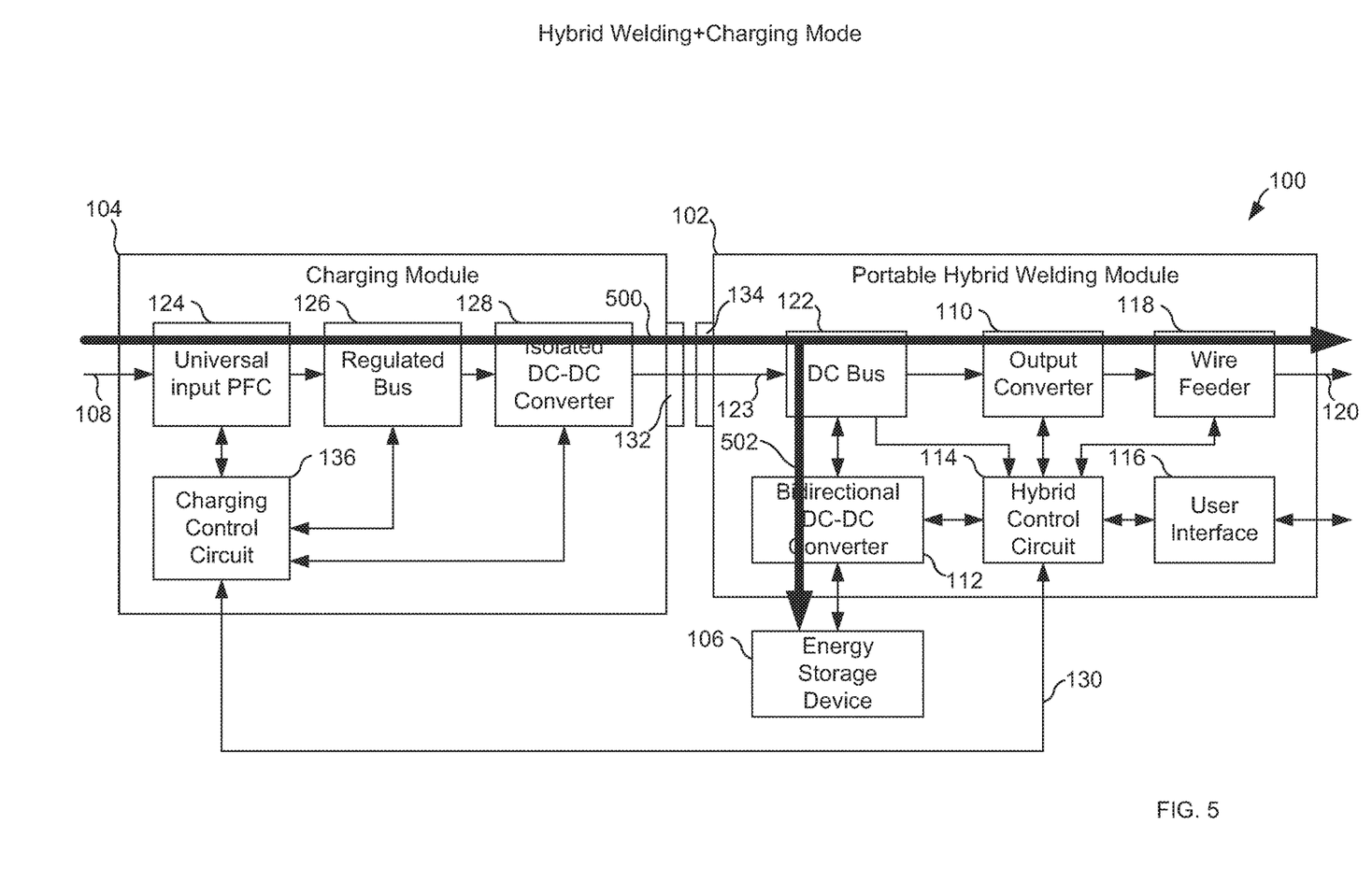
FIG. 5 illustrates current flow in the example hybrid welding system of FIG. 1 during a hybrid welding-charging mode.

FIG. 5 illustrates current flows 500, 502 in the example hybrid welding system 100 of FIG. 1 during a hybrid welding-charging mode. In the hybrid welding-charging mode, the hybrid control circuit 114 controls the output converter 110 to convert a portion of the DC input power 123 to the welding power 120 and to output the welding power 120 (e.g., the current flow 500). During the hybrid welding-charging mode, the portion of the DC input power 123 converted by the output converter 110 is less than a capacity of the charging module 104. The hybrid control circuit 114 also controls the bidirectional DC-DC converter 112 to convert a portion of the DC input power 123 to charge the energy storage device 106 (e.g., the current flow 502). For example, the hybrid control circuit 114 may control the bidirectional DC-DC converter 112 to convert any or all power not used for welding to charge the energy storage device 106, where the total of the welding power and the charging power is limited by the output capacity of the charging module 104.

Figure 6:
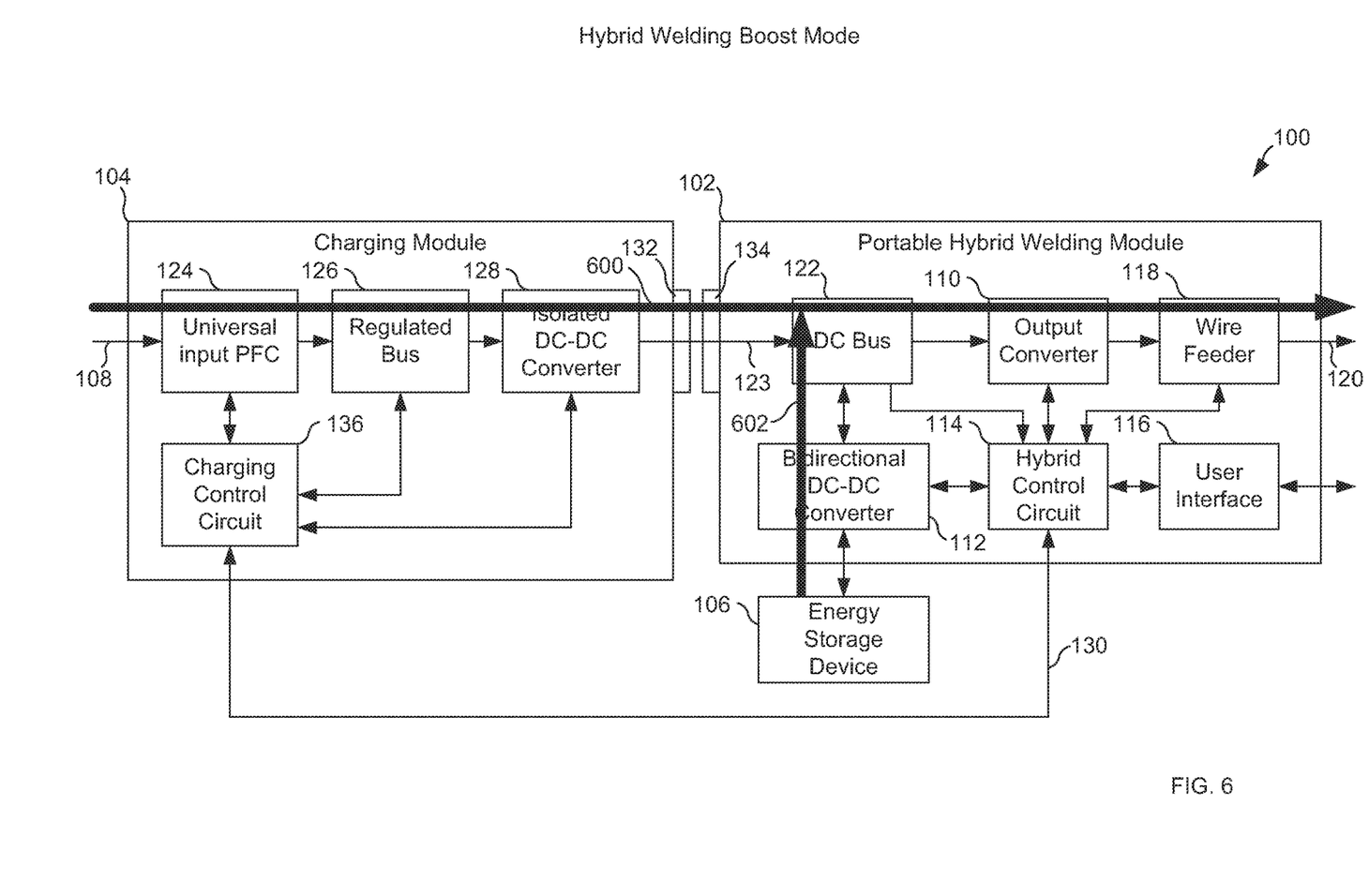
FIG. 6 illustrates current flow in the example hybrid welding system of FIG. 1 during a hybrid welding boost mode.

FIG. 6 illustrates current flows 600, 602 in the example hybrid welding system 100 of FIG. 1 during a hybrid welding boost mode, also referred to as a hybrid welding mode. In the hybrid welding boost mode, the DC input power 123 is provided to the DC bus 122 (e.g., the current flow 600). The bidirectional DC-DC converter 112 also provides converted stored power from the energy storage device 106 to the DC bus 122 (e.g., current flow 602). Thus, the combined power to the output converter 110 from the charging module 104 and the energy storage device 106 (via the bidirectional DC-DC converter 112) may exceed the output capacity of the charging module 104.

Figure 7:
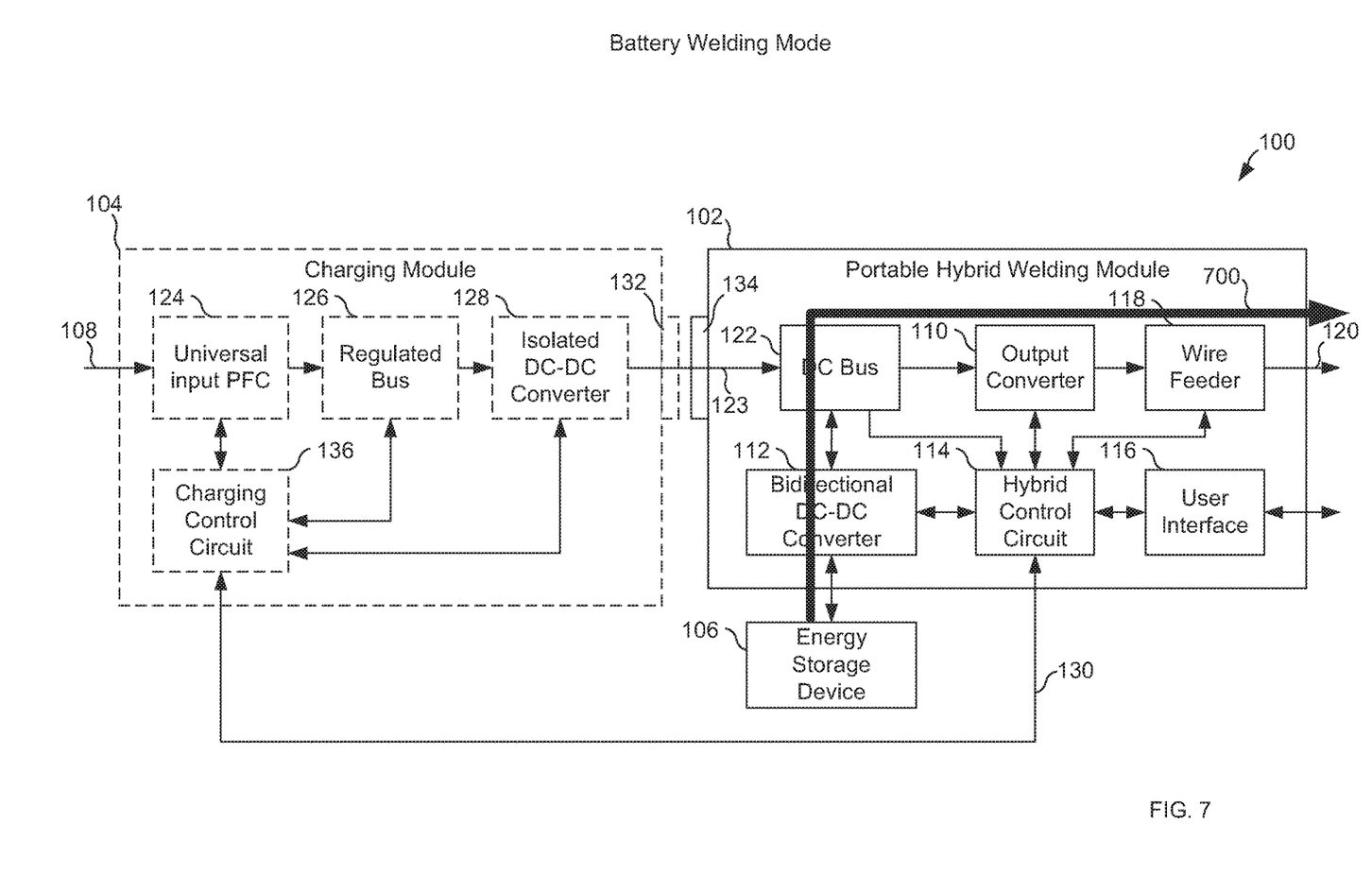
FIG. 7 illustrates current flow in the example hybrid welding system of FIG. 1 during a battery welding mode.

FIG. 7 illustrates current flow 700 in the example hybrid welding system 100 of FIG. 1 during a battery welding mode, also referred to as a discharge mode. During the battery welding mode, the current flow 700 derives solely from the energy storage device 106, regardless whether the charging module 104 is present. The battery welding mode enables the portable hybrid welding module 102 to be used for welding when the AC input power 108 is unavailable. Additionally or alternatively, the battery welding mode may be used to provide weld start power when the charging module 104 is powered down or in an idle state and powered down or in an idle state and not capable of providing power.

While the charging module 104 is connected to the portable hybrid welding module 102, the example portable hybrid welding module 102 may change between the welding mode, the charging mode, the hybrid welding-charging mode, the hybrid welding boost mode, and/or the battery welding mode in accordance with welding operations starting and/or stopping. Changes between modes may be driven by the hybrid control circuit 114, the charging control circuit 136 by the presence or absence of a welding operation, and/or by a change in the load on the welding power 120 relative to the maximum power that can be provided by the charging module 104. For example, when the load decreases below the maximum load of the charging module 104, the portable hybrid welding module 102 may change from the welding mode to the welding-charging mode to charge the energy storage device 106 during the welding operation. Conversely, when the load increases above the maximum load, the portable hybrid welding module 102 may change from the welding mode to the welding-boost mode and provide additional current via the bidirectional DC-DC converter 112.

As mentioned above, the hybrid control circuit 114 may control the bidirectional DC-DC converter 112 to provide the converted battery power to the DC bus 122 by controlling the bidirectional DC-DC converter 112 to output a voltage that is less than the voltage of the DC bus 122. If the load on the welding power 120 exceeds the output capacity of the charging module 104, causing the voltage of the DC bus 122 to droop below the voltage output of the bidirectional DC-DC converter 112, power from the energy storage device 106 will supplement power from the charging module 104 at the DC bus 122 and increase the load that can be output by the output converter 110 as the welding power 120.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A portable welding power supply, comprising:
    an output converter circuit configured to convert direct current (DC) power to welding power, the DC power comprising at least one of DC input power or converted battery power;
    a battery;
    a bidirectional DC-DC converter circuit configured to receive the DC input power and coupled to the battery; and
    a control circuit configured to:
        detect whether the battery is a recognized battery unit by determining whether the battery is on a list of approved or authorized battery units;
        when the control circuit detects that the battery is on the list of approved or authorized battery units:
            control the output converter circuit to output the welding power;

control the bidirectional DC-DC converter circuit to convert the DC input power to charge the battery based on one or more predetermined characteristics of the recognized battery unit; and
control the bidirectional DC-DC converter circuit to convert power from the battery to provide the converted battery power to the output converter circuit based on the one or more predetermined characteristics of the recognized battery unit; and
in response to detecting that the battery is not the recognized battery unit, at least one of:
enable welding without use of the battery;
disable the bidirectional DC-DC converter circuit; or
display a notification via the display device.

2. The portable welding power supply as defined in claim 1, wherein the battery is removable from the portable welding power supply.

3. The portable welding power supply as defined in claim 1, wherein the control circuit is configured to determine whether a charging device is connected to the portable welding power supply based on at least one of detecting the DC input power, detecting a connection with the charging device via a communications terminal, or detecting an analog or digital signal.

4. The portable welding power supply as defined in claim 3, wherein the control circuit is configured to control output power from the charging device.

5. The portable welding power supply as defined in claim 1, wherein the control circuit is configured to:
monitor at least one of an output current and an output voltage from the output converter circuit, an input current to a charging device, or a regulated DC input voltage of the DC input power;
determine whether a threshold output of the charging device has been exceeded based on the at least one of the output current and the output voltage from the output converter circuit, the input current to the charging device, or the regulated DC input voltage; and
control the bidirectional DC-DC converter circuit to provide the converted battery power to the output converter circuit when the threshold output of the charging device has been exceeded.

6. The portable welding power supply as defined in claim 5, further comprising a user interface device, the control circuit configured to indicate a mode of operation via the user interface device, the mode of operation comprising at least one of:
a battery charging mode;
an external power welding mode in which the DC input power is provided to the output converter circuit for welding while the bidirectional DC-DC converter circuit does not provide the converted battery power;
a battery welding mode in which the bidirectional DC-DC converter circuit provides the converted battery power to the output converter circuit for welding while the DC input power is not available; or
a hybrid welding boost mode in which the DC input power is provided to the output converter circuit and the bidirectional DC-DC converter circuit provides the converted battery power to the output converter circuit for welding.

7. The portable welding power supply as defined in claim 5, wherein the control circuit is configured to determine whether the threshold output of the charging device has been exceeded by comparing the output current and the output voltage to a voltage-amperage curve associated with the charging device.

8. The portable welding power supply as defined in claim 5, wherein the control circuit is configured to control the bidirectional DC-DC converter circuit to provide the converted battery power to the output converter circuit by controlling the bidirectional DC-DC converter circuit to output a converted voltage less than the threshold output voltage of the charging device.

9. The portable welding power supply as defined in claim 1, wherein the control circuit is configured to:
determine whether a threshold output of a charging device has been exceeded; and
when the threshold output has been exceeded, enable the bidirectional DC-DC converter circuit to provide the converted battery power to the output converter circuit.

10. The portable welding power supply as defined in claim 1, wherein at least one of the DC input power or the converted battery power are regulated power.

11. The portable welding power supply as defined in claim 1, wherein at least one of the DC input power or the converted battery power are unregulated power.

12. The portable welding power supply as defined in claim 1, wherein the control circuit is configured to:
detect a state-of-charge of the battery;
control the bidirectional DC-DC converter circuit to charge the battery based on the state-of-charge of the battery; and
control the bidirectional DC-DC converter circuit to output the power from the battery based on the state-of-charge of the battery.

13. The portable welding power supply as defined in claim 12, wherein the control circuit is configured to control the output converter circuit to limit the welding power based on the state-of-charge of the battery.

14. The portable welding power supply as defined in claim 1, further comprising a user interface device, the control circuit configured to:
at least one of measure a charge state of the battery or receive the charge state from a recognized battery; and
indicate the charge state via the user interface device.

15. The portable welding power supply as defined in claim 1, wherein the output converter circuit is configured to receive the DC input power and is configured to receive the converted battery power.

16. A hybrid power welding system, comprising:
a primary power adapter configured to convert primary power to DC input power using at least an isolated DC-DC converter, and to output the DC input power via a DC output connector; and
a portable welding power supply, comprising:
a DC input connector detachably connected to the DC output connector and configured to receive the DC input power;
an output converter circuit to convert DC power to welding power, the DC power comprising at least one of the DC input power or converted battery power;
a battery;
a bidirectional DC-DC converter circuit configured to receive the DC input power and coupled to the battery;
a control circuit configured to:
during a battery charging mode, control the bidirectional DC-DC converter circuit to convert the DC input power to charge the battery;

during an external input welding mode, control the output converter circuit to convert the DC input power to the welding power and to output the welding power;

during a hybrid welding boost mode:
control the bidirectional DC-DC converter circuit to convert power from the battery to provide the converted battery power to the output converter circuit; and
control the output converter circuit to convert the converted battery power and the DC input power to the welding power to increase the welding power to be greater than the DC input power; and during a hybrid welding-charging mode:
control the bidirectional DC-DC converter circuit to buck a first portion of the DC input power to charge the battery; and
control the output converter circuit to convert a second portion of the DC input power to the welding power and to output the welding power.

17. The hybrid power welding system as defined in claim 16, wherein the battery is removable from the portable welding power supply.

18. The hybrid power welding system as defined in claim 16, further comprising a user interface device, the control circuit to select between the external input welding mode and the hybrid welding boost mode based on receiving an input via the user interface device.

19. The hybrid power welding system as defined in claim 16, wherein the control circuit is configured to:
detect whether the battery is a recognized battery unit by determining whether the battery is on a list of approved or authorized battery units; and
when the control circuit detects that the battery is the recognized battery unit:
control the bidirectional DC-DC converter circuit to charge the battery based on one or more predetermined characteristics of the recognized battery unit; and
control the bidirectional DC-DC converter circuit to control the power from the battery based on the one or more predetermined characteristics of the recognized battery unit.

20. The hybrid power welding system as defined in claim 19, further comprising a display device, wherein the control circuit is configured to, in response to detecting that the battery is not the recognized battery unit, at least one of:
enable welding without use of the battery;
disable the bidirectional DC-DC converter circuit; or
display a notification via the display device.

21. The hybrid power welding system as defined in claim 19, wherein the control circuit is configured to, when the control circuit detects that the battery is the recognized battery unit, control the output converter circuit to limit the welding power based on the one or more predetermined characteristics of the recognized battery unit.

* * * * *